(12) United States Patent
Brown

(10) Patent No.: US 7,340,778 B2
(45) Date of Patent: Mar. 4, 2008

(54) METHOD AND APPARATUS FOR ENSURING THE COPY PROTECTION OF DIGITAL DATA

(75) Inventor: Stephen Nigel Brown, Basingstoke (GB)

(73) Assignee: Macrovision Corporation, Santa Clara, CA (US)

( * ) Notice: Subject to any disclaimer, the term of this patent is extended or adjusted under 35 U.S.C. 154(b) by 815 days.

(21) Appl. No.: 10/202,132

(22) Filed: Jul. 24, 2002

(65) Prior Publication Data
US 2004/0019797 A1    Jan. 29, 2004

(51) Int. Cl.
G06F 21/22 (2006.01)
H04N 7/167 (2006.01)
H04L 9/00 (2006.01)
H04K 1/00 (2006.01)

(52) U.S. Cl. .................. 726/32; 713/193; 380/201; 705/57

(58) Field of Classification Search ........ 380/203–208, 380/210, 236, 238; 726/26; 713/193
See application file for complete search history.

(56) References Cited

U.S. PATENT DOCUMENTS

| | | | |
|---|---|---|---|
| 5,394,274 A | | 2/1995 | Kahn |
| 5,583,936 A | * | 12/1996 | Wonfor et al. .............. 380/204 |
| 5,602,815 A | * | 2/1997 | Klappert et al. ......... 369/59.25 |
| 5,748,733 A | * | 5/1998 | Quan ......................... 380/204 |
| 6,167,136 A | * | 12/2000 | Chou ......................... 380/201 |
| 6,285,765 B1 | * | 9/2001 | Quan ......................... 380/204 |
| 6,353,890 B1 | * | 3/2002 | Newman .................... 713/193 |
| 6,408,390 B1 | * | 6/2002 | Saito ......................... 713/193 |
| 6,501,842 B2 | * | 12/2002 | Quan ......................... 380/221 |
| 6,665,240 B1 | * | 12/2003 | Kobayashi et al. ....... 369/47.15 |
| 6,980,653 B1 | * | 12/2005 | Sako et al. ................. 380/203 |
| 7,039,187 B2 | * | 5/2006 | Sako et al. ................. 380/203 |
| 7,062,047 B2 | * | 6/2006 | Sako et al. ................. 380/203 |
| 7,062,784 B2 | * | 6/2006 | Sinquin et al. ............... 726/26 |
| 7,085,380 B2 | * | 8/2006 | Quan ......................... 380/204 |
| 2001/0028615 A1 | * | 10/2001 | Carson et al. ............ 369/47.12 |
| 2002/0144123 A1 | * | 10/2002 | Newman .................... 713/176 |
| 2002/0165825 A1 | * | 11/2002 | Matsushima et al. ......... 705/51 |

FOREIGN PATENT DOCUMENTS

| | | | |
|---|---|---|---|
| EP | 0 915 620 A1 | * | 5/1999 |
| WO | WO 95/03655 | * | 2/1995 |
| WO | 01/15028 | | 3/2001 |
| WO | WO 01/41130 | * | 6/2001 |

* cited by examiner

*Primary Examiner*—Christopher Revak
(74) *Attorney, Agent, or Firm*—Schwegman, Lundberg & Woessner P.A.

(57) ABSTRACT

When digital data is to be copy protected at a processing station, for example, prior to its encoding and recording onto an optical disc, it is necessary to control a compliant encoder to utilise copy protection files to perform the copy protection routine. To ensure that the digital data is reliably copy protected, predetermined noise signals are incorporated into the digital data and the processing steps which add the copy protection are additionally caused to remove the noise signals. By this means, if the digital data is not copy protected, the noise signals remain. This enables non-copy protected digital data to be readily identified and ensures that it is effectively unusable to a consumer.

29 Claims, 3 Drawing Sheets ed data at the processing sta-
METHOD AND APPARATUS FOR ENSURING THE COPY PROTECTION OF DIGITAL DATA The present invention relates to a method of ensuring digital data is copy protected and to media produced by the method and to files for producing the method.

More and more data is being provided on optical discs such as CDs and DVDs. However, burners or other recording devices for copying optical discs are becoming available to the consumer such that there is a ever growing need to protect the digital data recorded thereon against copying. Numerous copy protection techniques have been proposed and, increasingly, publishers of digital data require that the copies issued to the public are copy protected by appropriate techniques.

However, the mastering houses which produce CDs and DVDs will produce both copy protected discs and discs without copy protection. The encoders used in the mastering houses do not, for example, incorporate within them the ability to detect which input data requires copy protection and then to automatically copy protect that input data identified. This means that the possibility exists that input data will be incorrectly encoded onto an optical disc without copy protection such that the data is made available for copying.

The present invention has identified that there is a problem in ensuring that digital data encoded onto an optical disc is copy protected and proposes solutions.

According to the present invention there is provided a method of ensuring digital data is copy protected, the method comprising the steps of:

delivering input data to a processing station; and subjecting the input data at the processing station to one or more processing steps such that processed digital data is output, wherein at least one of the processing steps is a step to add copy protection; wherein the input data at the processing station has had predetermined noise signals incorporated therein; and wherein the method further comprises the step of arranging that the processing step or steps adding the copy protection cause the removal of said predetermined noise signals.

With embodiments of a method of the invention, the input data at a processing station has had noise added thereto. If, during processing of that input data at the processing station, copy protection is added, the copy protection processes cause the added noise to be removed. Thus, the digital data output is copy protected digital data from which the added noise has been removed. However, if, for example, through human failure, the input data is not subject to a copy protection technique, the noise signals will not be removed. These added noise signals will therefore appear in the processed digital data output from the processing station.

It can be chosen whether the noise is to be incorporated, for example, just at the beginning of the input data. In this case, those checking the data output can be quickly and easily alerted to the fact that copy protection has not been added. Alternatively, the predetermined noise signals may be incorporated throughout the input data so that if the noise is not removed the resulting digital data output is, in effect, unusable to a consumer.

Preferably, the input data is to be encoded at the processing station, and at least one of the processing steps is a step to encode the data.

Generally, digital data is encoded at the processing station. The input data with the incorporated predetermined noise signals may be in either digital or analog form. Where the input data is supplied as analog it is converted into digital as one of the processing steps.

It is generally intended that the processed digital data output from the processing station in accordance with embodiments of the method of the invention is to be recorded onto a optical disc. However, the method may find use where the processed digital data is to be copy protected for recording on other media or is to be used in other situations.

Preferably, the method further comprises the step of reading or playing the processed digital data output from the processing station to check that the predetermined noise signals have been removed.

The predetermined noise signals can be chosen, for example, so that they are at locations in the digital data output which are readily accessible. For example, it may be arranged that the noise is present at the start of a music track on an audio CD. This means that the output from the processing station can be quickly checked. In this respect, the presence of the predetermined noise signals indicates that no copy protection has been added to the encoded data and/or that the copy protection technique has failed, whilst the absence of such noise reveals that appropriate copy protection has been provided.

A publisher or compiler of data who provides input data to a mastering house, for example, can ensure that the input data is subject to copy protection by incorporating the predetermined noise signals to the input data before it is delivered to the mastering house. The input data with the predetermined noise signals may be delivered to the processing station recorded on an optical disc, on a tape, or on any other record carrier.

Additionally and/or alternatively a method of the invention further comprises the step of adding the predetermined noise signals to the input data at the processing station before said one or more processing steps are undertaken.

In this alternative, the noise signals are added to the input data as it is prepared for further processing at the processing station. Where the data is to be encoded for application to an optical disc, for example, the addition of the predetermined noise signals is undertaken before the encoding and other processing steps.

The added predetermined noise signals can be chosen as required and as is appropriate to the nature of the data. For example, erroneous values, which cause noise spikes, may be added into the input data in the digital domain at preselected locations. For audio data, for example, such erroneous values correspond to impulses superimposed onto the analog audio data and, if played, produce audible clicks. Additionally and/or alternatively, impulses may be superimposed onto the input data in the analog domain at preselected locations. Such "spikes" in the input data are readily discernible in any domain. This is important both for the checking of the digital data output from the processing station, but also in ensuring that the added noise signals are reliably and accurately removed.

The predetermined noise signals can be removed by providing, for example, at the processing station, details of the noise signals which have been added. For example, the locations of predetermined noise signals may be identified and the method may comprise the step of removing or restoring data at each identified location.

Where the added noise is, for example, erroneous values in the digital domain and/or impulses added in the analog domain, the step of removing the noise may comprise detecting the added noise by detecting erroneous values and/or impulses in the input data and identifying the locations at which the noise occurred, and removing or restoring the data at each identified location.

The detection of the added noise and the restoration of the input data may be done, for example, by looking at the values of the data and determining a more appropriate value, and/or an audio detector may be used which reacts to "clicks", and/or a visual detector may be provided to display the data such that any impulses are visible. The process may be performed automatically and/or under the intervention of an operator. What is required, of course, is that the added noise can be identified and removed quickly and easily and the appropriate values restored. In most cases this will be done by providing to processing means at the processing station details of the noise which has been added and its location. This information can be provided together with the copy protection information so that the removal of the noise and the addition of the copy protection is mutually dependent.

As set out above, the primary function of the added noise signals is to provide discernible noise if the copy protection processing has not been performed or completed. However, it is additionally possible to ensure that the noise signals as added additionally carry information. Thus, the added noise signals are arranged not to be random but, to be coded and, for example, could identify the type of copy protection required and/or for any other purpose.

Where the input data is audio, the added noise signals will be audible either to the human ear or to a machine.

The present invention is not limited to the type of copy protection which is used and that will be chosen, for example, to be appropriate to the nature of the input data. For digital audio compact discs (CD-DA) schemes such as those described in, for example, WO 01/15028 and GB Application No. 0116278.3 may be utilised. Furthermore, although currently the copy protection files to prepare the input data for encoding are provided at the processing station, it would be possible for copy protection files to be added to the input data by the publisher or compiler.

The present invention also extends to apparatus for copy protecting input data comprising a processing station arranged to receive input data and to output processed digital data, said apparatus being arranged to perform a method as defined above.

According to a further aspect of the present invention, there is provided an executable application file arranged to ensure digital data is copy protected, the application file comprising:

an instruction to replace data values at preselected locations in input data during processing of the input data to add copy protection, and an instruction to output the processed data in digital form.

In an embodiment, the executable application file further comprises an instruction to detect the data values to replace by determining the existence of data values in locations which should be absent of data values and/or by determining the existence of data values with erroneous values.

The present invention also extends to an executable application file arranged to ensure that digital data is copy protected, the application file comprising:

predetermined noise signals for addition to input data, an instruction to add the predetermined noise signals to input data which is to be copy protected, and an instruction to add the predetermined noise signals at preselected locations.

According to the invention, there is also provided a data carrier carrying encoded digital data for recording on an optical master disc, the digital data having been processed by a method as defined above, and/or having been processed using an executable application file as defined above.

Embodiments of the present invention will hereinafter be described, by way of example, with reference to the accompanying drawings, in which.

The embodiments of the invention described and illustrated herein are described with specific reference to the manufacture of digital audio compact discs (CD-DA). However, the methods described herein are not limited to the recording of audio data onto a CD and may be utilised, for example, to ensure that any digital data recorded onto an optical disc is copy protected.

Figure 1:
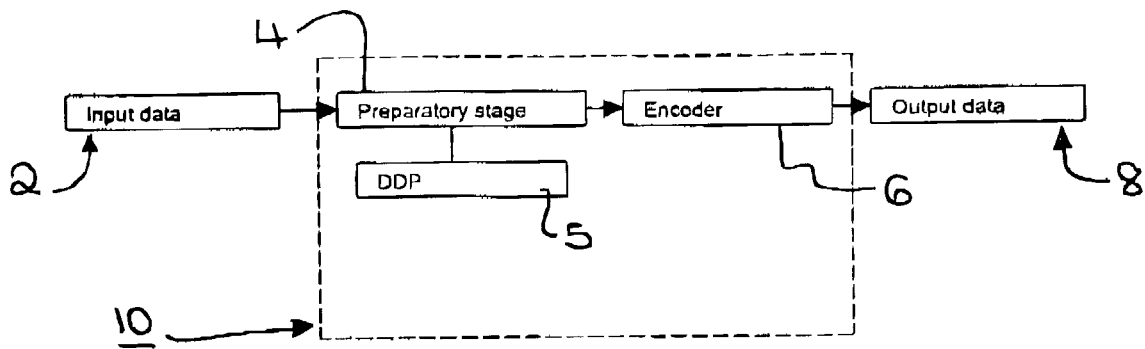
FIG. 1 shows schematically a process of mastering a CD.

FIG. 1 indicates schematically the mastering of a CD-DA at a mastering house. As is well known, a publisher or compiler provides input data 2 which is to form the audio content of a CD master. This input data 2 may be, for example, analog recordings on tape or on disc, or may be digital audio data similarly provided on tape or disc. If the input data 2 is analog it is converted into digital as an initial stage of the processing.

Any initial processing, such as analog to digital conversion, is undertaken at a preparatory stage 4 of a processing station 10. In addition, files 5 in accordance with an agreed Disc Description Protocol (DDP) are provided to prepare the input data 2 for encoding. Thereafter, prepared input data is applied to an encoder 6 where it is encoded and then output as processed digital output data 8. The output data 8 is preferably output on a master tape or disc which will be used to produce the CD master.

Figure 2:
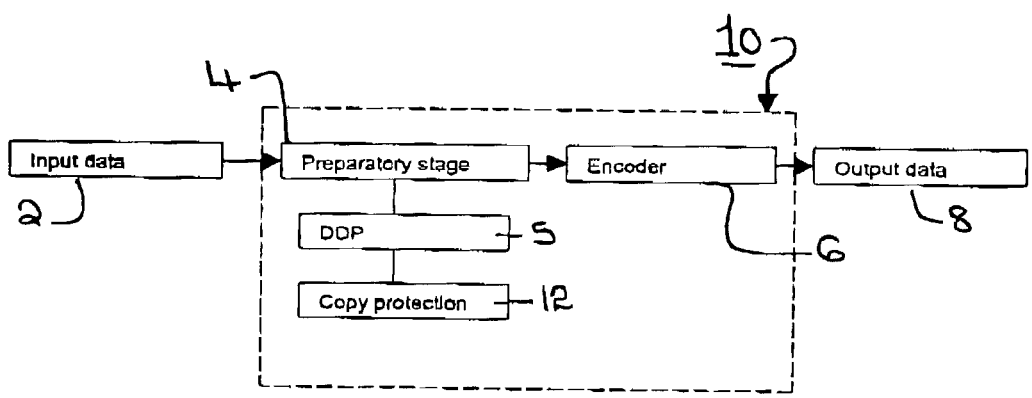
FIG. 2 shows schematically a similar process of that of FIG. 1 but with the addition of copy protection to the CD.

FIG. 2 shows an alternative method to that of FIG. 1 arranged to copy protect the processed output data 8. In this embodiment, copy protection files 12 are utilised to prepare the input data for encoding together with the DDP files 5.

In this case, if the prepared data from the preparatory stage 4 is input to a compliant encoder 6, the resulting processed output digital data 8 will be copy protected.

As an alternative, which is not illustrated, the copy protection files 12 may be provided with the input data 2, for example, by the publisher or compiler.

In this respect, DDP files as 5 do not incorporate any agreed protocol for copy protection. A standard encoder, as 6, will not look for, and utilise, copy protection files 12 even where they are provided. To initiate copy protection requires both copy protection files 12 and a compliant encoder controlled to perform the copy protection routine.

At present, there is the problem that human intervention is required to identify input data 2 which is to be copy protected and then to ensure that the encoder 6 is controlled to perform a copy protection routine using the copy protection files 12 in the preparation of the data 2. Furthermore, if copy protection data is not added to the input data during its preparation for encoding, the input data 2 will be encoded and output at 8 without the required copy protection. As the processed digital data output will be perfect, perfect and copyable CDs will result from the mastering process.

Figure 3:
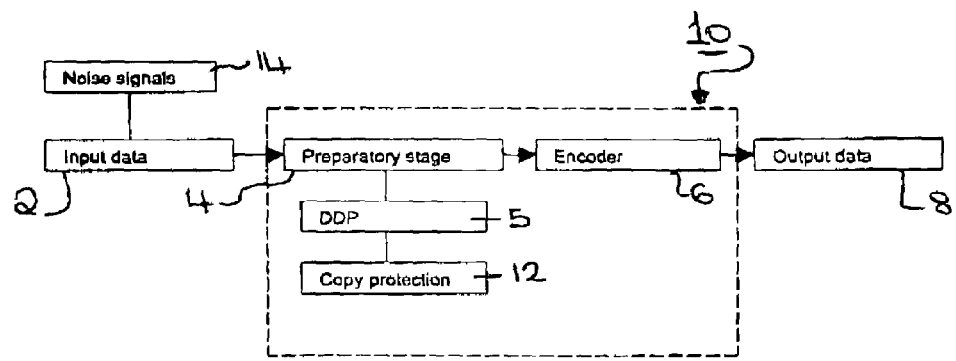
FIG. 3 shows schematically a method of the invention for ensuring that the audio content of the CD is copy protected.

FIG. 3 illustrates schematically one method of the present invention to ensure that the CD-DAs are copy protected. In the embodiment shown in FIG. 3, the input data 2 which is to be presented to a processing station 10 has had predetermined noise signals, as indicated at 14, added thereto. These noise signals 14 may be added to the original input data 2 in the analog or the digital domain. The noise signals 14 are arranged to act as markers to ensure that copy protection is appropriately applied. Accordingly, at the processing station 10, the input data 2, with the added noise signals 14, is subject to preparation under the control of DDP files 5 and is also subject to copy protection under the control of the copy protection files 12. However, the copy protection files 12 are modified such that the copy protection process removes the added noise. Accordingly, it will be appreciated that the processed digital data 8 output from the processing station 10 will, if it has been copy protected, be free from the added noise. However, if the copy protection process has failed, for example, because the encoder 6 did not recognise and act on the copy protection files 12, the processed digital data 8 output will still incorporate the noise signals 14. The existence of the noise can be readily detected either by human ear, or eye, or by detection means.

Figure 4:
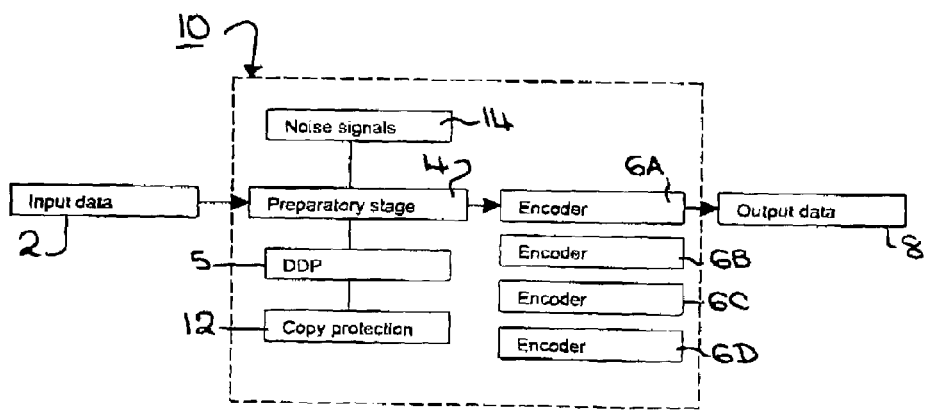
FIG. 4 shows a further schematic embodiment of a method of the invention.

FIG. 4 shows an alternative embodiment in which the input data 2 is provided to the processing station 10 without the addition of noise. In this embodiment, means are included in the preparatory stage 4 to add noise signals 14 to the input data 2. Thereafter, the input data is prepared under the control of the DPP files 5 and the copy protection files 12. The preparation is to be controlled such the noise signals 14 are detected and removed as copy protection is added to the input data under the control of the copy protection files 12. Of course, and as previously, this requires that the encoding takes place by way of a compliant encoder 6A.

In the embodiment shown in FIG. 4, the processing station 10 is shown to have four separate encoders 6, labelled A, B, C and D. Only the A encoder is, in this embodiment, compliant with the copy protection techniques. It is therefore required that any input data 2 which is to be copy protected is fed for encoding to the A encoder 6. This can be achieved by an automatic process arranged to be performed at the preparatory stage 4 in which the existence of any added noise, as 14, is detected. Where there is added noise, the input data 2 is prepared with the copy protection files 12 and then directed to the compliant A encoder 6.

Additionally and/or alternatively, the presence of added noise may be detected by an operator and used to cause the addition of copy protection files and then the use of the correct compliant encoder 6A.

The nature and format of the added noise can be chosen as required. For audio applications it is particularly useful to add to the digital input data, erroneous values which cause noise spikes in the analog domain. These additions of spikes are made at preselected locations. Such erroneous values correspond to impulses superimposed on the analog audio data and, if played, produce audible clicks. The added noise spikes in the input data are readily discernible in any domain.

In one embodiment of a method of the invention, for an audio CD, it is proposed to add spikes, that is, audible erroneous values, before the commencement of the first audio track.

From the above, it will be appreciated that if the spikes are added to the audio data, but the data escapes the application of copy protection before it is encoded, the output digital data 8 will similarly have spikes at the commencement of the audio track. The existence of such spikes can readily be determined, for example, by looking at the output data on a display, and/or by listening to the output when the audible clicks will be apparent. Alternatively, automatic detection is possible. However made, a check of the processed data at the output 8 will quickly reveal when the required copy protection has not been incorporated.

It would be possible to incorporate added noise signals throughout the input data 2 so that any data which is processed, but without being subject to copy protection will produce a very poor recording on the resultant CD. However, at present, it is thought that it will be sufficient to add noise signals at a few well chosen locations. Making relatively few additions of spikes has the advantages that it reduces the effort necessary to remove the noise during the addition of copy protection and enables the process to be undertaken without there being any need to alter the underlying audio data in any way.

Figure 5:
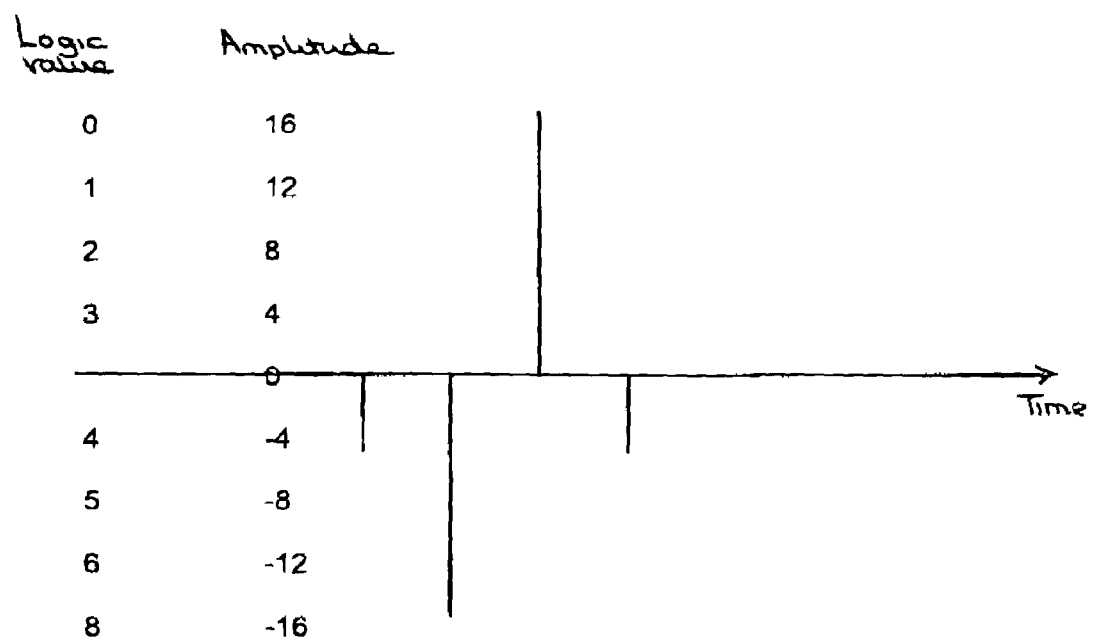
FIG. 5 illustrates how noise signals can be utilised to carry information.

It will be appreciated that the addition of noise signals, for example, as specific erroneous values can be used to carry information. FIG. 5 illustrates, logic values which might be accorded to digital data amplitudes. The erroneous values illustrated, for example, may be the noise signals added at the commencement of an audio track. It will be seen that these samples can be used to represent the values 4704. By adding noise signals representing values in this manner, it is possible to tag the input data 2 with information which may be used for any purpose.

It will be appreciated that variations in and modifications to the embodiments as described and illustrated may be made within the scope of this application as defined in the appended claims.

The invention claimed is:

1. A method of ensuring data is copy protected, the method comprising:
   receiving input data at a processing station;
   modifying a copy protection process to enable the removal of predetermined noise signals comprising erroneous signals added into the input data at preselected locations, upon detecting that the input data include the predetermined noise signals; and
   applying the modified copy protection process to the input data thereby both removing the predetermined noise signals, upon detecting that the input data include the predetermined noise signals, and copy protecting the input data.

2. The method of claim 1, further including encoding the input data.

3. The method of claim 2, wherein the input data is digital data which is then encoded at the processing station.

4. The method claim 2, wherein the input data is in analog form, which is then converted into digital data and encoded.

5. The method of claim 1, wherein processed data output from the processing station is to be recorded onto an optical disc.

6. The method of claim 1, further comprising reading or playing processed data output from the processing station to check that the predetermined noise signals have been removed.

7. The method of claim 1, wherein the predetermined noise signals have been incorporated in the input data by a publisher or compiler, the input data with the added predetermined noise signals being delivered subsequently to the processing station.

8. The method of claim 7, wherein the input data with the said predetermined noise signals are delivered to the processing station recorded on an optical disc, on a tape, or on any other data carrier.

9. The method of claim 7, wherein processed data output from the processing station is to be recorded onto an optical disc.

10. The method of claim 7, further comprising reading or playing processed data output from the processing station to check that the predetermined noise signals have been removed.

11. The method of claim 1, further comprising adding the predetermined noise signals to the input data at the processing station upon detecting that the received input data does not include the predetermined noise signals.

12. The method of claim 11, wherein processed output from the processing station is to be recorded onto an optical disc.

13. The method of claim 11, further comprising reading or playing processed data output from the processing station to check that the predetermined noise signals have been removed.

14. The method of claim 1, further comprising providing to the processing station identification of the locations of the predetermined noise signals, and removing or restoring the data at each identified location.

15. The method of claim 1, wherein the predetermined noise signals comprise erroneous values which are added into the input data in the digital domain at pre-selected locations.

16. The method of claim 15, further comprising detecting the predetermined noise signals by detecting erroneous values in the digital domain of the input data and identifying the locations at which the detected noise occurred, and removing or restoring the data at each identified location.

17. The method of claim 16 further comprising reading or playing the processed digital data output from the processing station to check that the predetermined noise signals have been removed.

18. The method of claim 16, wherein the predetermined noise signals have been incorporated in the input data by a publisher or compiler, the input data with the added predetermined noise being delivered subsequently to the processing station.

19. The method of claim 16, wherein the input data with the said predetermined noise signals are delivered to the processing station recorded on an optical disc, on a tape, or on any other data carrier.

20. The method of claim 1, wherein the predetermined noise signals comprise erroneous impulses which are superimposed onto the input data in the analog domain at pre-selected locations.

21. The method of claim 20, further comprising detecting the predetermined noise signals by detecting impulses in the analog domain of the input data and identifying the locations at which the detected noise occurred, and removing or restoring the data at, each identified location.

22. The method of claim 21, further comprising reading or playing processed data output from the processing station to check that the predetermined noise signals have been removed.

23. The method of claim 21, wherein the predetermined noise signals have been incorporated in the input data by a publisher or compiler, the input data with the added predetermined noise signals being delivered subsequently to the processing station.

24. The method of claim 21, wherein the input data with the said predetermined noise signals are delivered to the processing station recorded on an optical disc, on a tape, or on any other data carrier.

25. The method of claim 1, wherein the predetermined noise signals are arranged to carry information.

26. Apparatus for copy protecting input data comprising a processing station arranged to receive input data, the input data including predetermined noise signals comprising erroneous signals added into the input data at pre-selected locations, said processing station including a copy protection process, a preparatory circuit to modify the copy protection process to enable the removal of the predetermined noise signals, and an encoder circuit responsive to the preparatory circuit, wherein the encoder circuit encodes the input data to produce a processed digital data output which is copy protected, wherein the modified copy protection process causes the encoder circuit to remove the predetermined noise signals from the processed digital data output.

27. Apparatus for copy protecting input data comprising a processing station arranged to receive input data and to output processed digital data, said processing station by including a noise generator which adds predetermined noise signals comprising erroneous signals added into the input data at pre-selected locations, a copy protection process, a preparatory circuit to modify the copy protection process to enable the removal of the predetermined noise signals, and an encoder circuit responsive to the preparatory circuit, wherein the encoder circuit encodes the input data to produce processed digital data which is copy protected, wherein the modified copy protection process causes the encoder circuit to remove the predetermined noise signals from the processed digital data output.

28. A data carrier carrying encoded digital data for recording on an optical master disc, the digital data having been processed from input data, the input data including predetermined noise signals comprising erroneous signals added into the input data at pre-selected locations, the digital data having been processed by modifying a copy protection process to enable the removal of the predetermined noise signals, and applying the modified copy protection process to the input data thereby both removing the predetermined noise signals and copy protecting the input data.

29. The data carrier of claim 28, wherein the data carrier is an optical disc.

* * * * *